United States Patent [19]

Howard

[11] Patent Number: 5,585,813

[45] Date of Patent: Dec. 17, 1996

[54] ALL ASPECT HEAD AIMING DISPLAY

[75] Inventor: Emily L. Howard, San Pedro, Calif.

[73] Assignee: Rockwell International Corporation, Seal Beach, Calif.

[21] Appl. No.: 529,466

[22] Filed: Sep. 18, 1995

Related U.S. Application Data

[63] Continuation of Ser. No. 276,077, Jul. 5, 1994, abandoned, which is a continuation of Ser. No. 956,185, Oct. 5, 1992, abandoned.

[51] Int. Cl.$^6$ .................................................. G09G 5/00
[52] U.S. Cl. .................................. 345/8; 345/9; 359/630
[58] Field of Search ...................... 345/7, 8, 9; 359/630, 359/631

[56] References Cited

U.S. PATENT DOCUMENTS

| | | | |
|---|---|---|---|
| 4,092,716 | 5/1978 | Berg et al. ............................... | 364/424 |
| 4,147,056 | 4/1979 | Muller .................................... | 73/178 T |
| 4,218,111 | 8/1980 | Worthrington ......................... | 350/3.72 |
| 4,312,262 | 1/1982 | Tye ......................................... | 89/41 A |
| 4,439,755 | 3/1984 | LaRussa ................................. | 340/980 |
| 4,528,891 | 7/1985 | Brunello et al. ....................... | 89/41.21 |
| 4,740,779 | 4/1988 | Cleary et al. .......................... | 340/705 |
| 4,807,158 | 2/1989 | Blanton et al. . | |
| 4,843,459 | 6/1989 | Perrin et al. ........................... | 358/93 |
| 4,868,652 | 9/1989 | Nutton ................................... | 358/113 |
| 4,878,054 | 10/1989 | Reynaud ................................ | 340/975 |
| 4,977,401 | 12/1990 | Sjoberg ................................. | 340/975 |

OTHER PUBLICATIONS

Ivan E. Sutherland, "A head–mounted three dimensional display", Fall Joint Computer Conference, 1968, pp. 757–763.

Article entitled "Airplane–Runway–Performance—Monitoring–System", p. 48 of NASA Tech Briefs, Jun. 1992 issue.

*Primary Examiner*—Mark R. Powell
*Assistant Examiner*—Matthew Luu
*Attorney, Agent, or Firm*—Lawrence N. Ginsberg; Charles T. Silberberg; Terrell P. Lewis

[57] ABSTRACT

A method and apparatus for real-time analysis and display of information to provide information which will enable a user to be continuously apprised of all objects within a predetermined radius from the user's location (a "sphere of interest") while at the same time establishing the user's position relative to a fixed reference system. The invention involves determining the location and orientation of the user relative to a fixed reference system (such as the earth), as well as the location and orientation of objects in the sphere of interest about the user. Display of this information is on a display format, which may be embodied on an optical medium such as a helmet visor, a heads-up display media, a projection surface or a user's eye.

13 Claims, 4 Drawing Sheets

ALL ASPECT HEAD AIMING DISPLAY

This is a continuation of application Ser. No. 08/276,077 filed on Jul. 5, 1994, now abandoned, which is a continuation U.S. Ser. No. 07/956,185 filed on Oct. 5, 1992 now abandoned.

BACKGROUND OF THE INVENTION

1. Field of the Invention

The present invention relates generally to indicating methods and apparatus, and more particularly to real-time, virtual image display apparatus for indicating the location of and distance to objects within a predetermined distance from a specified location. The invention specifically relates to a helmet or screen display for demonstrating to an aircraft pilot the relative locations of objects within a predetermined radius of a reference point in the pilot's airspace.

2. Background of the Invention

Head up displays have long been used in the military aircraft industry in combat exercises as well as in simulated, training exercises. Today, new areas of use are envisioned, as for example in space exploration, laporoscopic surgery, undersea operations, and hazardous waste clean-up activities.

Typically, when virtual image display equipment is used, the operator must analyze visual images depicting the spatial layout of his or her working environment, and in the course of doing so, may experience disorientation or uncertainty regarding his or her position within the depicted environment relative to some reference coordinate system or to other elements in the same environment.

There is therefore a need for apparatus which will enable operators to orient themselves and navigate within their working environement.

From U.S. Pat. No. 4,977,401 to Sjoberg, an aircraft display system is known which uses an inertial navigation platform 5, a signal processing unit 6, a picture producer or display generator 7 to detect and process signals, a cathode ray tube 8 and a mirror 9 to project an indicating display in the form of the inside of a sphere on a display comprised of a transparent reflecting plate known as a "combiner glass" 10. The aircraft pilot sees the indicator picture or display in a display plane 12 located at a certain distance from the pilot. A symbol 13 of the velocity vector of the aircraft and a symbol 14 of the x-axis of the aircraft are projected onto the display plane 12.

This apparatus, however, has proven to have several drawbacks. One is that it is forward-looking having a narrow field of view. For this reason, the pilot cannot ascertain the presence or position of moving objects outside of his present field of view. Another is that the presentation of spacial reference information spans across the entire reference field and therefore clutters and interferes with other images that the pilot may try to view simultaneously, such as target and weapon information, aircraft status, etc.

OBJECTS OF THE PRESENT INVENTION

It is therefore a principal object of the present invention to provide a real-time method and apparatus for displaying information which will enable a user to be continuously apprised of all objects including those objects outside the field of view of the viewing apparatus within a predetermined radius from the user's location while at the same time establishing his position relative to a fixed reference system.

It is another object of the present invention to provide a method and apparatus for providing real-time determination, proximate to a pilot's position and orientation, of the position and orientation of all objects, both friend and foe, and displaying this information in real-time.

Still another object of the invention is to provide a method for converting azimuth and elevation angles of objects within a sphere of interest about the user into hemispheric projection coordinates for the display, system of the present invention.

These and other objects and advantages are achieved via the method and apparatus of the present invention in which the location and orientation of the user are determined relative to a fixed reference system (such as the earth) and then the location and orientation of objects in the user's neighboring space are determined relative to the user. In particular, the invention contemplates display of this information on helmet mounted or head-up display media.

DETAILED DESCRIPTION OF THE INVENTION

Figure 1:
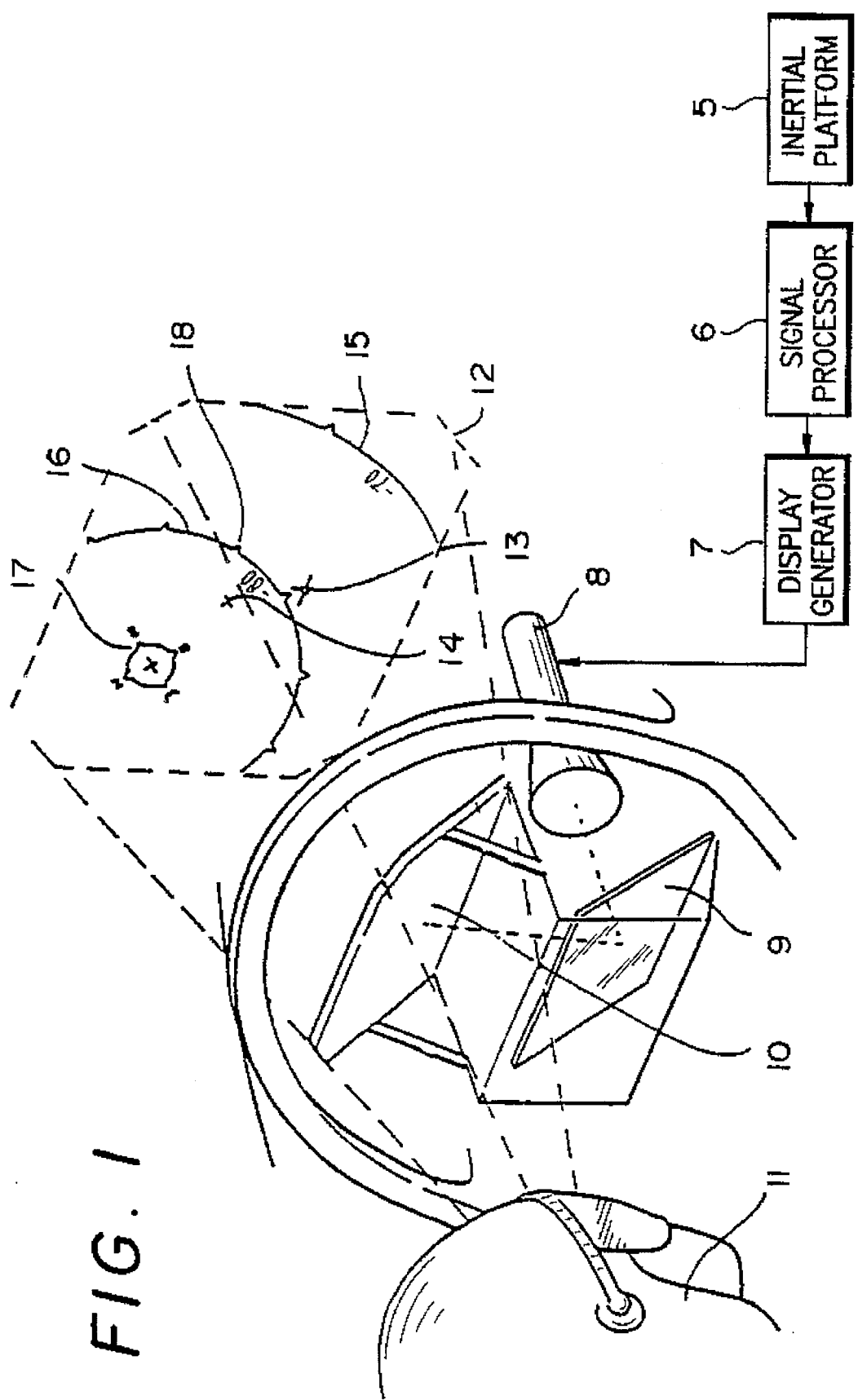
FIG. 1 shows components of a virtual display system disclosed in U.S. Pat. No. 4,977,401.
Figure 2:
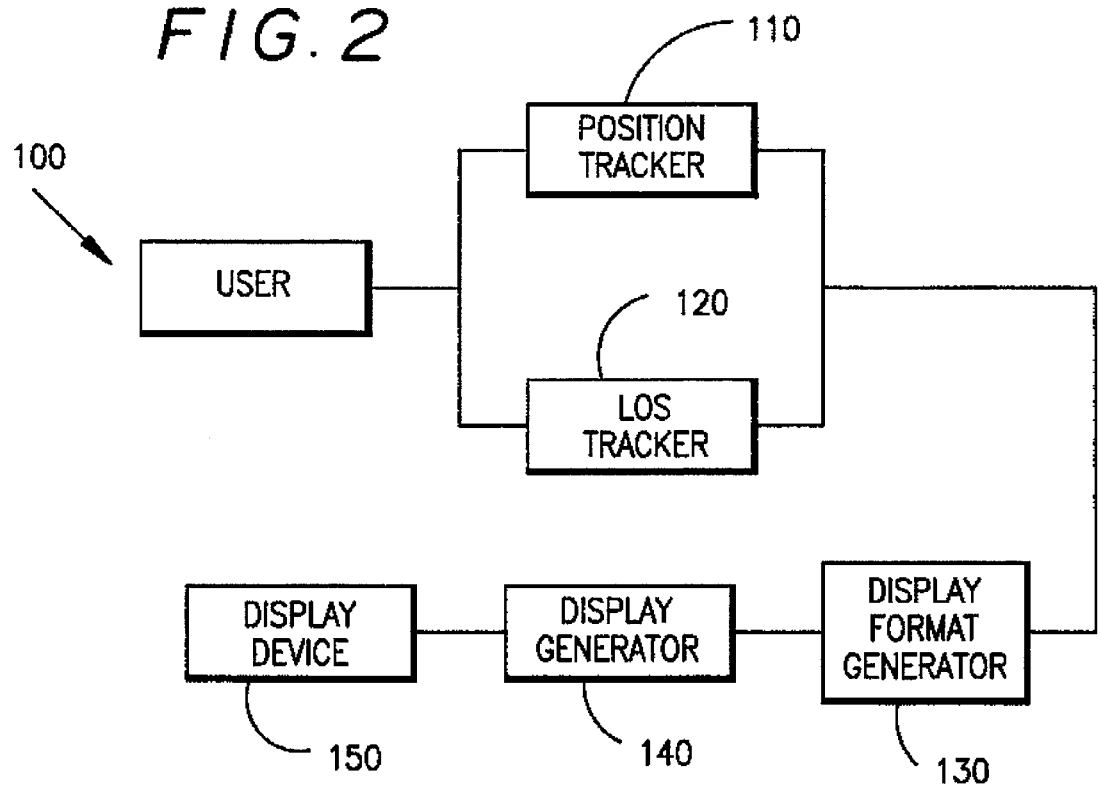
FIG. 2 schematically illustrates the components of the virtual display system of the present invention.

Referring now to FIG. 2, the virtual display system of the present invention, shown generally at 100, includes a clock device (not shown) and one or more position and orientation tracking instruments 110, one or more line-of-sight (LOS) trackers 120, apparatus for performing a relative bearing analysis 130, a display format generator 140, and a display device 150.

The instruments 110 provide values corresponding to the positions and orientations of the user and key elements or objects in the working environment, such as other operators, tools or vehicles (friend or foe) present within the same environment, and/or specific reference points (such as landmarks, entrances, exits, and starting or ending positions).

Exemplary instruments include sensors (such as radar or camera equipment), gyros (such as in navigation systems), communication links (such as satellite receivers), or computer datafiles (such as reference libraries or for simulations). Regardless of the type of source, the instrument outputs are all defined by a known frame of reference, such as Euclidean or polar coordinates. These reference coordinates are specific to the objects within the sphere of interest only, and do not necessarily reflect the user's literal, physical position or orientation (as in remote or simulated environments). As shown in the FIG. 2 drawing, the instruments 110 are electronically coupled with the relative bearing analysis apparatus 130.

The line-of-sight (LOS) trackers 120, also electronically coupled with the relative bearing analysis apparatus 130, monitor the user's current viewing parameters within the sphere of interest. These viewing parameters include azimuth, elevation, and twist (rotations about the vertical, transverse and longitudinal axes, respectively), which may vary independently of the user's position.

Exemplary embodiments of LOS trackers include sensor signals that represent viewing parameters measured directly from the user's head (such as magnetic head-trackers) or software algorithms to interpret cursor, mouse, control stick, or keyboard inputs that manipulate the user's viewpoint indirectly (by commanding vehicle pitch, roll, and yaw, for example).

The relative bearing analysis apparatus 130 is an analytical electronic device used to determine the LOS-relative bearings values corresponding to the azimuth and elevation of all locations or objects of interest, based upon their positions and the user's position, orientation and line-of-sight. The relative bearing analysis apparatus employs simple vector mathematics to sum and thus determine the appropriate combinations of angles.

The display format generator 140, electronically coupled with and receiving signals from the relative bearing analyzer 130, translates the LOS-relative bearing values into visual cues that orient the user with respect to the locations of interest which have been recognized and identified (see discussion below with reference to FIGS. 3–5).

The display device 150, by which the visual cues from the generator 140 are transmitted to the user, is the same one that provides the user with his or her view of the target environment directly. By combining the visual LOS relative bearing cues with the direct view of the target environment, the user can remain aware of important locations within the environment even as they move outside the user's direct (eye) view. Nevertheless, by stimulating peripheral vision, the LOS-relative bearings cues do not interfere with the user's ability to focus on any element within the environment via his or her central field-of-view. Exemplary display devices include CRT screens, LCD screens, heads-up display combiners, or helmet-mounted display combiners and/or visors.

Where the display devices are of the type that are fixed or secured to a support not connected with the user's body or head (i.e., a desk top CRT or heads-up display combiner), the display system contributes to the user's general awareness of key elements or objects in the sphere of interest about himself or his sensing device (eg., a hand-held surgical probe) even when those elements or objects are located spatially outside the field of view of the viewing apparatus.

On the other hand, where the display devices are supported on the user's person (as for example on his helmet visor), the display system instructs the user where to point his head to view the same key elements or objects in the working environment. Further discussion on this aspect of the invention will be found below in connection with FIG. 5 of the drawings.

Figure 3:
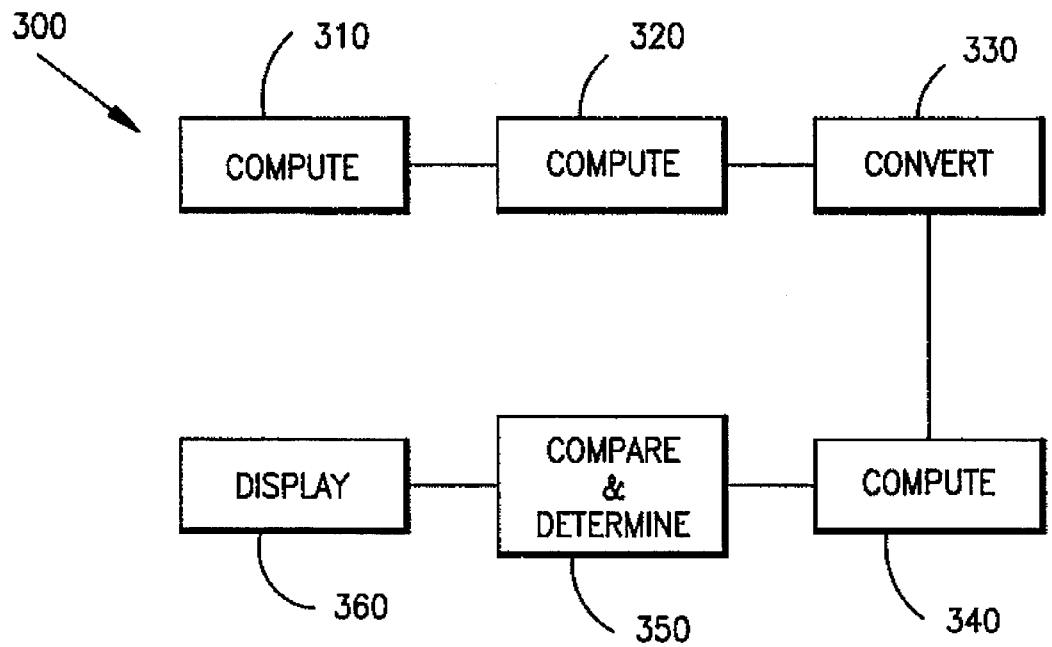
FIG. 3 is a flow chart of an algorithm which the present invention implements for the conversion of coordinate values associated with locations of objects in the vicinity of the user to coordinates for projection onto the display plane format of FIG. 4.
Figure 5:
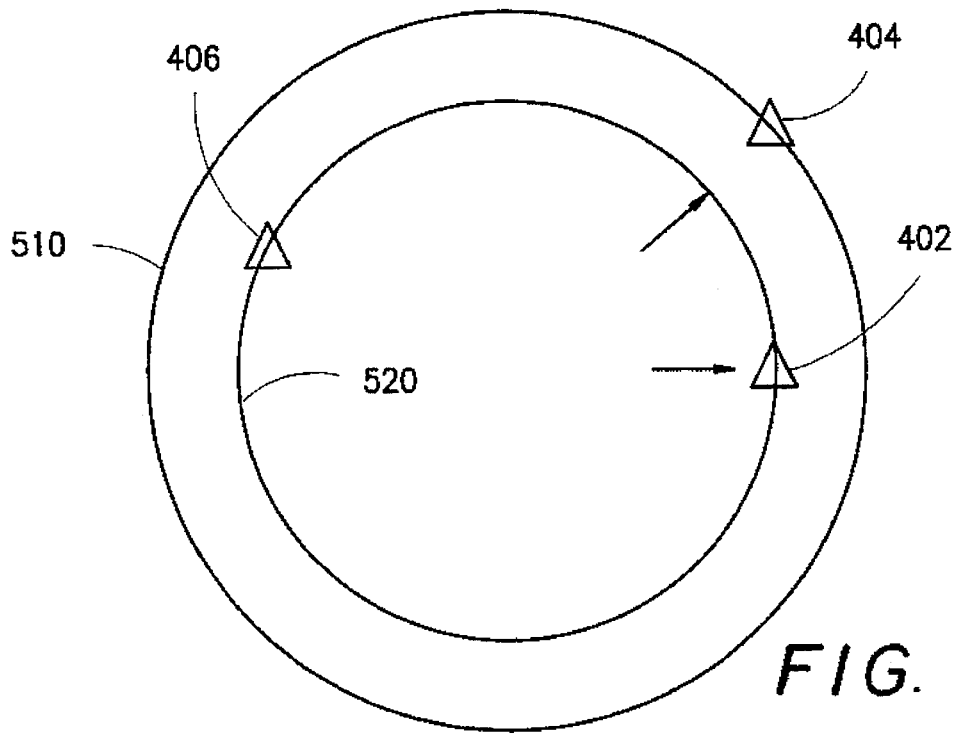
FIG. 5 shows one embodiment of the display plane format created by the apparatus of the present invention.

Referring now to FIG. 3, there is shown a flow chart of the algorithm 300 employed for converting the signals or cues from the LOS relative bearing analyzer into visual signals which ultimately are processed by the display device 150 to produce a visual display pattern such as shown in FIG. 5.

The algorithm illustrated in FIG. 3 is time dependent, i.e., the train of calculations are made for each unit of time measured by a clock device (not shown) appropriately provided in the system of the invention.

In the first step 310 of the algorithm, values representative of two concentric circles are computed and stored. Each circle represents one of two hemispherical spaces within a sphere of interest about the user consisting of a forward hemisphere and a rearward hemisphere.

Figure 4:
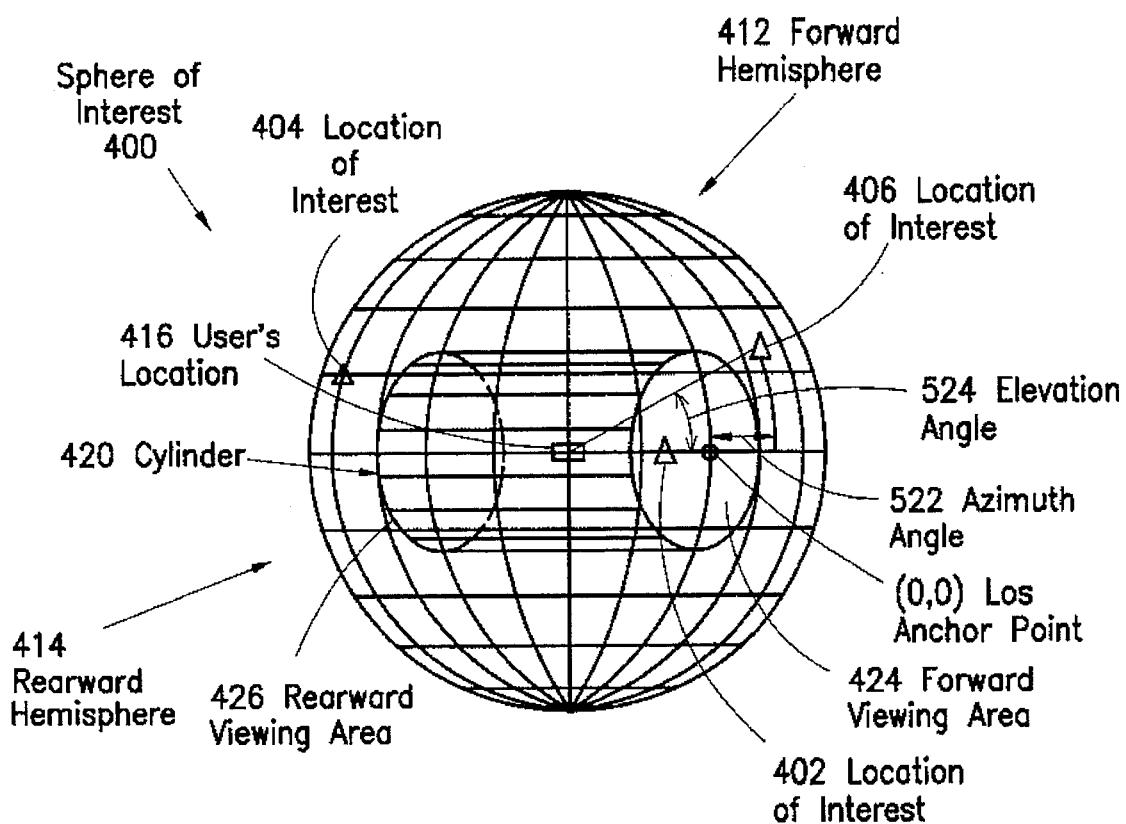
FIG. 4 illustrates the sphere of interest about the user with which the present invention is concerned.

The sphere of interest 400, for purposes of the algorithm, is depicted in FIG. 4 and is divided into a forward hemisphere 412 and the rearward hemisphere 414. The sphere of interest is centered about the user's location 416. Locations of interest 402, 404, 406 will appear at any point within the sphere. The point on the sphere of interest having azimuth and elevation angle coordinates (0,0) is an "anchor point" which is optically coupled and aligned with the user's LOS tracker.

The inventive algorithm contemplates that the location of the user is surrounded by a "cylinder" 420 having its axis of symmetry (i.e., its length) directed along the line of sight (the LOS vector) of the user. The cylinder is slightly conical in shape, and has a forward viewing area 424 slightly smaller in diameter than a rearward viewing area 426.

It is noted that for purposes of this discussion, the prism surrounding the user has circular end faces which serve as the viewing areas. However, it is within the scope of this invention that other geometrical shapes or boundaries could be used (and thus values therefor could be computed and stored) to define the viewing areas, such as squares or rectangles, triangles, ellipses, etc.

In a second step 320 of the algorithm, values representative of the azimuth 522 and the elevation angle 524 of each sensed and identified location of interest or "target", as for example object 406 in FIG. 5, in the space around the user are computed and stored (see discussion of the relative bearing analysis apparatus 130 in FIG. 2).

In a third step 330 of the algorithm, the azimuth value and the elevation angle value for each location of interest or target is converted into hemispheric coordinate values for superimposition onto one of the two circles computed in the first step (step 310).

In a fourth step 340 of the algorithm, a determination is made as to whether a specified location of interest or target is in the forward hemisphere 412 or in the rearward hemisphere 414. This entails comparing the azimuth values of the targets with a predetermined window of azimuth values representing the forward or the rearward hemisphere. The window of values for the forward hemisphere is between +90° and −90° from the anchor point (i.e., 90° to the left or right of the anchor point). The window of values for the rearward hemisphere is the mirror image of the forward hemisphere (i.e., the 180° angular sweep behind the user spanning from +90° to −90°).

In a fifth step 350 of the algorithm, the x and y display format coordinates are computed so that symbols representing the locations of interest or targets including those located spatially outside the field of view of the viewing apparatus may ultimately be projected exactly along the applicable circle's perimeters.

In a sixth step 360 of the algorithm, the targets are drawn on the screen and coloring of the targets can be effected to distinguish between desirable targets and undesirable targets.

In carrying out this method, the display format generator 140 assigns the relative bearings for each location of interest or target to one of two groups of values: a first group representing those locations of interest or targets in the hemisphere forward of the user and a second group representing those locations of interest or targets in the hemisphere rearward of the user. Each set of bearings is then "mapped" through a projection algorithm which converts the global latitude and longitude values (i.e., the azimuth and elevation values) into two-dimensional, Euclidean map coordinates, with one "mapping" for each hemisphere.

The display of these visual cues is presented to the user via a display format consisting of (preferably similar) geometrical shapes centered on or surrounding one another, as for example the two concentric rings 510, 520 that are representative of the user's field-of-view, as shown in FIG. 5.

Ring 520 in the embodiment of display format shown in FIG. 5 presents the LOS relative bearing cues associated with locations of interest within the user's forward hemisphere. The other ring 510 presents the LOS relative bearing cues associated with locations of interest within the user's rearward or aft hemisphere.

While the display of visual cues in FIG. 5 has been in the context of concentric circular rings, the invention also contemplates other geometric shapes located one within the other or overlapping (where two or more views are presented). For example, two squares, ellipses or triangles could be used.

The LOS relative bearing cues are projected onto the geometrical shapes (i.e., the circles 510, 520) by converting the map coordinates into their equivalent representation in polar coordinates, and than scaling the length of the polar vector to equal the radius of the appropriate circle.

As seen in FIG. 5, any objects of interest positioned within the forward hemisphere of the sphere of interest (FIG. 4) appear as symbols along the inner (smaller diameter) circle, while objects of interest positioned within the rearward hemisphere appear as symbols along the outer (larger diameter) circle. These various symbols provide a line-of-sight cue to the user that references the position and orientation of objects of interest around him.

The display format of FIG. 5 readily lends itself to use by the pilot of an aircraft. If the pilot's airspace (sphere of interest) has been invaded by another craft, the system will tell the pilot if it is above or below him, or in front of or behind him. It can also tell him what kind of aircraft it is, how fast and in what direction it is going, is it armed, etc.

Where the display device is helmet or visor mounted, the symbols will appear on either of the circles as the pilot's head and/or his craft move relative to the objects of interest. The value of this system to the pilot is its ability to assist him in aiming or pointing his head to visually find the objects which have entered his sphere of interest. Naturally, in doing so, the symbols will continue to move along or between the circles, but a pilot or user skilled in interpreting the information presented by this system will merely add this new information to that already acquired about his surrounding environment.

Various symbols near each line of sight cue could indicate the magnitude of the head motion of the user required to obtain each target in azimuth. Thus, this system enables the user to maintain full awareness of the spacial positions and orientations of various objects within his sphere of interest. Moreover, appropriate coding of these various symbols could be used to present different information. Such coding could take the form of different colors, different size attributes, different shapes, etc. In addition, by appropriate angular orientation of the symbols at the positions on the two circles, it is possible to present to the user the orientation of the object(s) relative to the user's environment.

Figure 6:
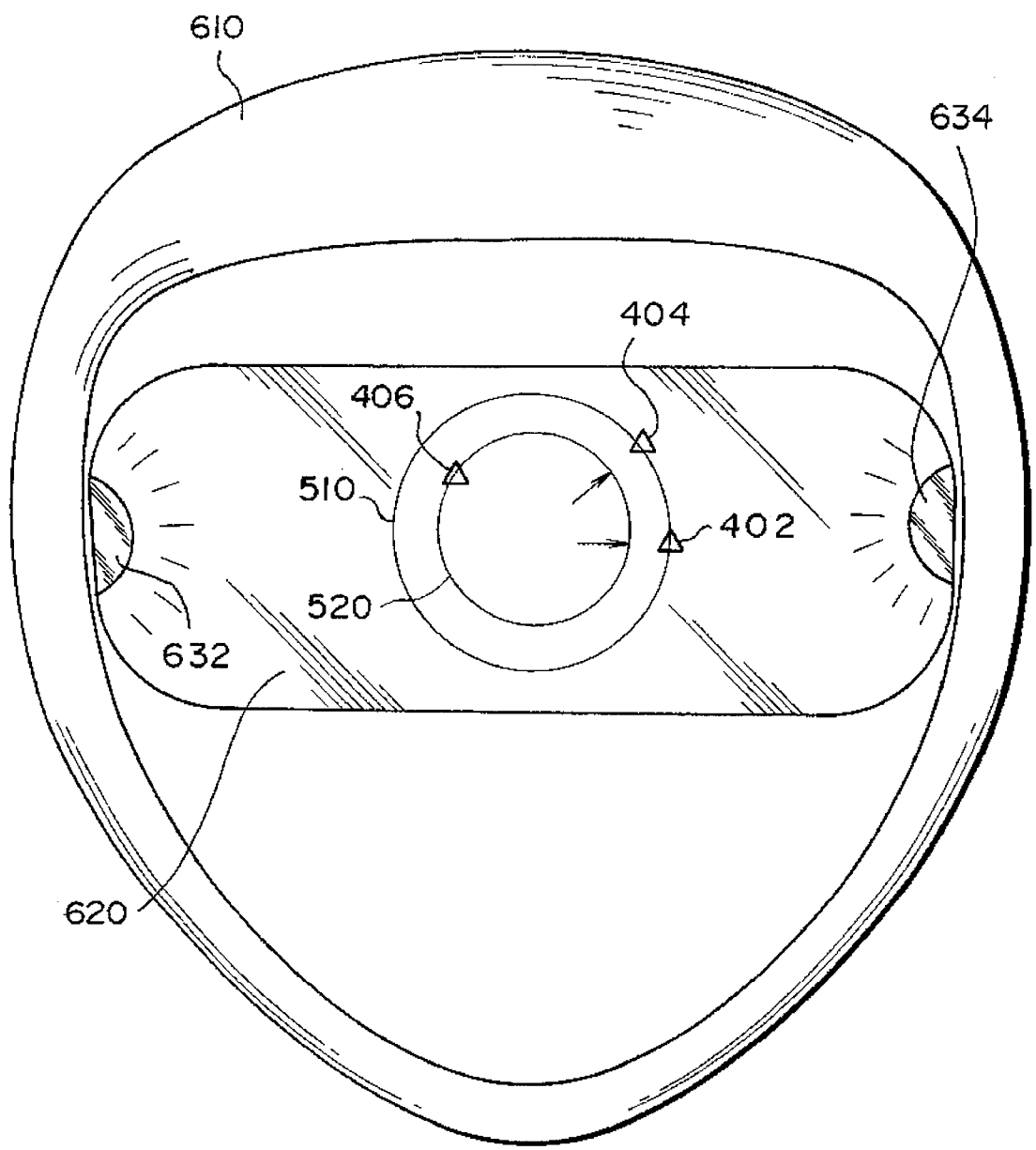
FIG. 6 illustrates one embodiment of a display system for presenting the information generated by the apparatus of the present invention to a user.

FIG. 6 shows one embodiment of a display device through which the display plane format of FIG. 5 could be presented to the user. In this Figure, the display medium is the surface of the visor on a pilot's helmet which faces the pilot's eyes (i.e., the inner surface of the visor).

As shown, the helmet 610 includes a visor 620 which has an optically opaque or transparent lens that spans opposite sides of the helmet across the pilot's eyes. Display devices 632, 634, positioned on opposite sides of the helmet project the display plane format 400 onto the inner surface of the visor in a centrally located region, so that as the pilot looks through the visor to view his surrounding environment, he can also be apprised, via the display on his visor, of the various objects (targets) in his surrounding airspace (sphere of interest) and their relative location, orientation and movement relative to his location.

While not disclosed in detail here, the present invention contemplates optical apparatus which is capable of projecting an image such as that represented in FIG. 5 directly onto the iris of the pilot/user or on the inner surface of glasses or goggles worn by the user.

While certain representative embodiments and details have been shown for the purpose of illustrating the invention, it will be apparent to those skilled in this art that various changes and modifications may be made therein without departing from the spirit or scope of this invention.

What I claim is:

1. A method for continuously identifying and displaying information relating to objects within a sphere of interest about a user, comprising:

determining values representing said sphere of interest about said user, and at least two distinct zones within said sphere of interest, one of said zones being outside the user's field of view, determining values indicative of said user's state within said sphere of interest, determining values indicative of each object's state within said sphere of interest, providing a display format for simultaneously visually representing the values corresponding to both of said at least two distinct zones within said sphere of interest, mapping said object values and said user values into symbols within said display format to provide a line-of-sight cue to the user that references said objects and forming visual images on said display format corresponding to said object and user values, and continuously repeating each set of said determining and mapping steps without interruption while displaying the visual images corresponding to each last determined set of user and object values, wherein said steps of determining user values includes identifying position and orientation attributes of said user and each of said objects, and said step of mapping said values includes presenting images representative of said user and each object such that said object images are distinguishable from said user image.

2. The method of claim 1, wherein said step of presenting includes the step of distinguishing one object image from another.

3. The method of claim 1, wherein the step of determining values assigned to each object within said sphere of interest includes the step of determining values associated with the motion, direction of travel, and location of said object at succeeding increments of time.

4. Apparatus for identifying and displaying the position and orientation of objects within a sphere of interest relative to a user, comprising:

means for determining values representing said sphere of interest about said user, and at least two zones within said sphere of interest, at least one of said zones being outside the user's field of view, means for determining values corresponding to the position and orientation of each of said objects within said sphere of interest, means for creating values representing a display format, means for mapping said values representing both of said zones and the values corresponding to the position and orientation of the user and the position and orientation of said objects into symbols within said display format to provide a line-of-sight cue to the user that references said objects, means for simultaneously displaying the values representing said display format including said mapped values, and clock means for continuously operating each of said means for determining, said means for mapping, and said means for displaying, without interruption, so that said means for displaying shows changes in said position and orientation of said objects without interruption.

5. The apparatus of claim 4, wherein said display format is embodied in a planar image.

6. The apparatus of claim 4, wherein said display format is embodied in a helmet visor.

7. The apparatus of claim 4, wherein said display format is embodied in a CRT screen.

8. The apparatus of claim 4, wherein said display format is embodied in a heads-up display combiner.

9. The apparatus of claim 4, wherein said means for determining values corresponding to the position and orientation of each of said objects within said sphere of interest comprises at least one tracking instrument and means for analyzing values generated by said at least one tracking instrument to generate values correlated to the azimuth and elevation angles of each object within a respective one of said zones in said sphere of interest.

10. The display apparatus of claim 4, wherein said display format is displayed on the iris of each eye of the user.

11. A two-dimensional display format for depicting a three dimensional representation of objects located within a sphere of interest about a user who is also located within said sphere of interest, said format comprising:

a defined optical area arranged in a display region located at a predetermined optical focal length relative to the user's eyes, a first geometrical boundary located within a said display region representing one zone in said sphere of interest, a second geometrical boundary located simultaneously within said display region representing an additional zone in said sphere of interest distinct from said one zone, said additional zone in said sphere of interest being outside the user's field of view, and a plurality of optical symbols positioned on at least one of said boundaries, each said optical symbol corresponding and providing a line-of-sight cue to a respective one of said objects located within said sphere of interest, wherein said additional zone in said sphere of interest has a viewing area greater than the viewing area of the first zone, said optical symbols being positionable on either of said geometric boundaries.

12. The display format of claim 11, wherein said geometric boundary is the perimeter of a circle.

13. The display format of claim 11, wherein said geometric boundaries are perimeters of circles.

* * * * *